US008115358B1

(12) United States Patent
Rakov

(10) Patent No.: US 8,115,358 B1
(45) Date of Patent: Feb. 14, 2012

(54) METHOD AND SYSTEMS FOR OPERATING MAGNETIC BEARINGS AND BEARINGLESS DRIVES

(76) Inventor: Mikhail A Rakov, Menlo Park, CA (US)

(*) Notice: Subject to any disclaimer, the term of this patent is extended or adjusted under 35 U.S.C. 154(b) by 201 days.

(21) Appl. No.: 12/406,888

(22) Filed: Mar. 18, 2009

(51) Int. Cl.
*H02K 7/09* (2006.01)
(52) U.S. Cl. .................................... 310/90.5; 310/68 B
(58) Field of Classification Search ............... 310/68 B, 310/90.5, 179; 318/630, 632, 115
See application file for complete search history.

(56) References Cited

U.S. PATENT DOCUMENTS

| | | | |
|---|---|---|---|
| 5,384,527 A | 1/1995 | Rozman et al. | |
| 5,872,408 A | 2/1999 | Rakov | |
| 5,914,578 A | 6/1999 | Rakov | |
| 6,101,084 A | 8/2000 | Rakov | |
| 6,140,793 A | 10/2000 | Carr et al. | |
| 6,525,506 B2 | 2/2003 | Jin | |
| 7,276,897 B2 | 10/2007 | Lee | |
| 7,282,878 B1 | 10/2007 | Rakov et al. | |
| 7,508,197 B1 | 3/2009 | Rakov et al. | |
| 2002/0171381 A1 | 11/2002 | Miyazaki et al. | |
| 2004/0155613 A1 | 8/2004 | Sugiyama et al. | |
| 2009/0224752 A1 | 9/2009 | Rakov | |

FOREIGN PATENT DOCUMENTS

WO WO 9940334 A1 * 8/1999

OTHER PUBLICATIONS

Hendershot, Jr. et al., "Design of Brushless Permanent-Magnet Motors", Magna Physics Publishing (1994), pp. 1-19.
Kenjo, "Electric Motors and Their Controls", Oxford University Press (1991), pp. 1-13.
Leonhard, "Control of Electrical Drives", 2nd ed., Springer Verlag (1996), pp. 75-77 and pp. 155-177.

* cited by examiner

*Primary Examiner* — Quyen Leung
*Assistant Examiner* — David W. Scheuermann
(74) *Attorney, Agent, or Firm* — George B. F. Yee; Fountainhead Law Group P.C.

(57) ABSTRACT

A magnetic bearing arrangement for a rotary device includes circuitry for generating a multiphase excitation signal for energizing the phase windings of a magnetic bearing element. According to an embodiment of the present invention, circuitry for detecting the radial position of a rotor of the rotary device generates a position signal indicative of the radial position of the rotor of the rotary device relative to a desired rotor position. The position signal is used to modify the excitation signal to produce a modified excitation signal. The modified excitation signal is used to energize the phase windings of the magnetic bearing, thus providing a low-cost and efficient means for dynamically suspending the rotor of the rotary device.

18 Claims, 16 Drawing Sheets

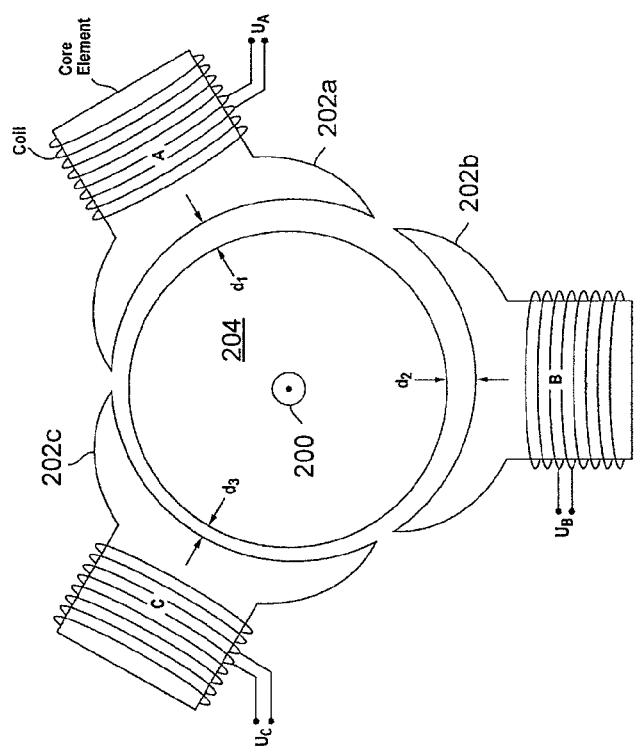
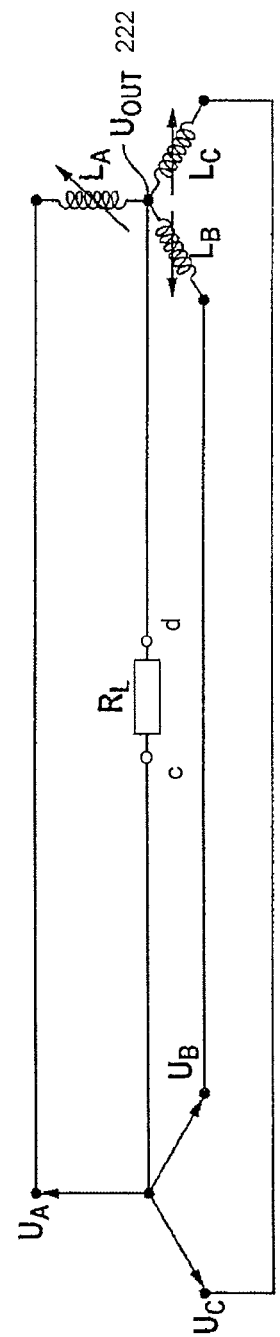
Fig. 2B
Fig. 2C

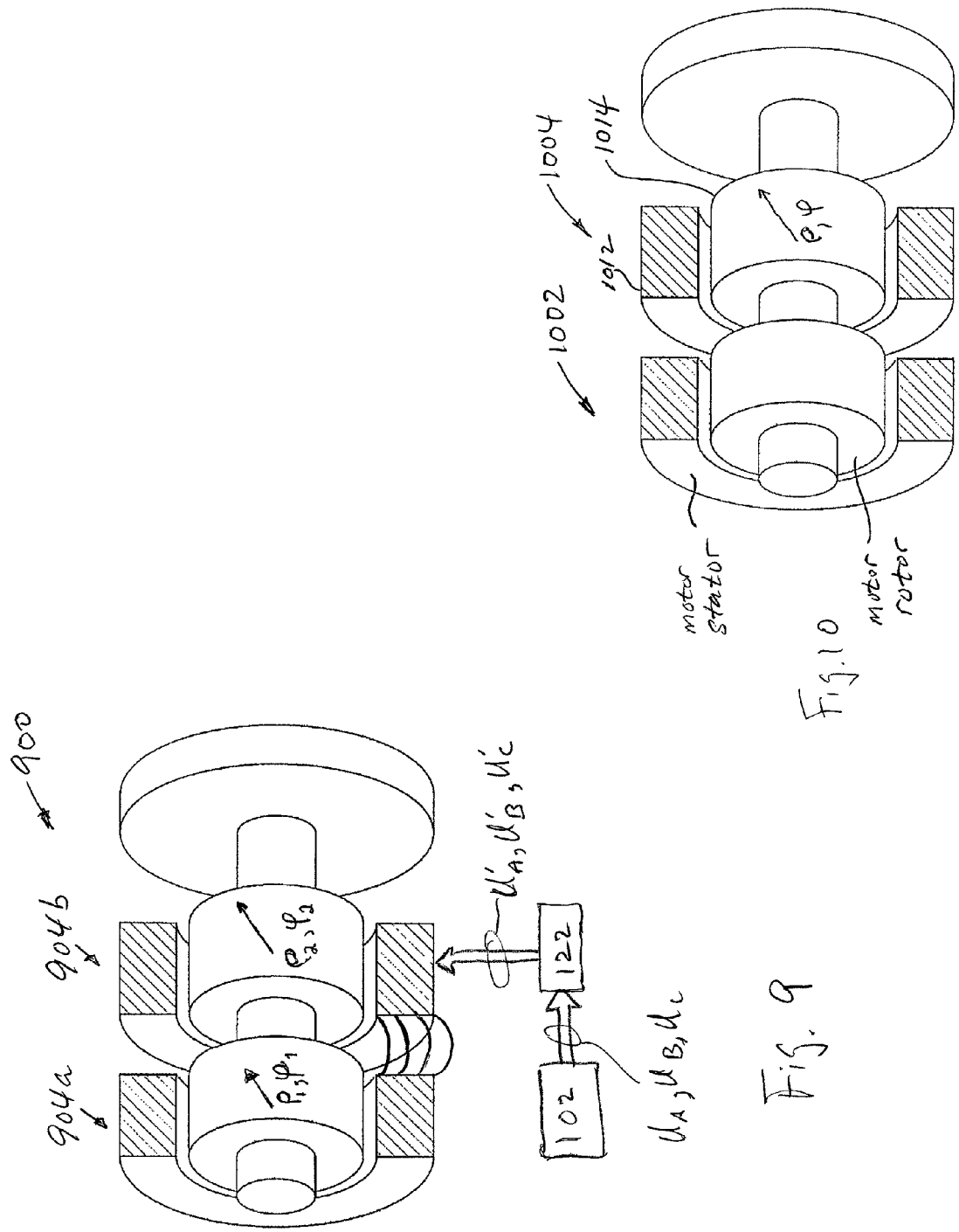

A-D: Analog to digital converter
D-A: Digital to analog converter
Σ : Digital Summator

METHOD AND SYSTEMS FOR OPERATING MAGNETIC BEARINGS AND BEARINGLESS DRIVES

CROSS-REFERENCES TO RELATED APPLICATIONS

This application is related to U.S. application Ser. No. 12/044,835, filed Mar. 7, 2008 and fully incorporated herein by reference for all purposes.

BACKGROUND OF THE INVENTION

The present invention is directed to magnetic bearings and to magnetic bearings in general, and to the use of magnetic bearings as configured in bearingless drives.

Broadly, a magnetic bearing supports a load using magnetic levitation. Magnetic bearings support moving machinery without physical contact; for example, they can levitate a rotating shaft of the rotor of a motor and permit relative motion without friction or wear. Magnetic bearings are used in lieu of a rolling element or fluid film journal bearings in some high performance turbo-machinery applications. Since there is no mechanical contact in magnetic bearings, mechanical friction losses are eliminated. In addition, reliability can be increased since there is no mechanical wear. Following are principles of operation, and examples, of conventional magnetic bearings.

FIG. 11 schematically represents a conventional magnetic bearing arrangement for a rotary device. A motor 1102 connected to a shaft 1104 is suspended by magnetic bearings 1106a, 1106b. Each bearing 1106a, 1106b generates radial forces in the x- and y-directions. A thrust bearing 1108 is optionally provided for positioning in the z-direction.

The motor 1102 is a conventional brushless motor comprising a stator element 1112 and a permanent magnet rotor element 1114. The stator 1112 comprises a set of phase coils which are energized in a specific manner to produce rotational torque about the z-axis. The construction of stators and rotors are well understood and need no further elaboration. An example of motor 1102 is a three-phase motor, where the stator 1112 comprises three phase coils. A suitable three-phase voltage source and a controller serve to energize the phase coils of the stator 1112 which magnetically interact with the rotor 1114 to produce rotational torque.

The magnetic bearings 1106a, 1106b each typically comprises four coils (see FIG. 12) arranged in respective bearing stators 1122a, 1122b. The bearing rotors 1124a, 1124b comprise a magnetic material. For each bearing stator 1122a, 1122b, two coils are arranged on the x-axis on opposing sides of the shaft 1104, and two coils are arranged on the y-axis on opposing sides of the shaft. Differing amounts of current are made to flow in each coil in order to affect the radial position of the shaft 1104 in the x-y directions. For example, when current flows in the coils, opposing magnetic forces are generated which act on the rotor 1124a. A radial force in the x-direction can therefore be generated by creating a difference in the magnetic forces generated by the x-axis coils; likewise for the y-direction.

Coil currents in the bearing stators 1122a, 1122b are regulated by suitable power and control circuitry. For example, a single phase voltage source can be provided for each coil (a total of eight for both magnetic bearings 1106a, 1106b).

Further detail of one of the bearing stators 1122a, 1122b is illustrated in FIG. 12 along with additional electronics detail. Referring to FIG. 12 then, a bearing stator 1222 is shown in cross-section and reveals an example of the arrangement of coils which comprise the bearing stator. Coils 1226$x_1$, 1226$x_2$ constitute the x-axis coils and coils 1226$y_1$, 1226$y_2$ constitute the y-axis coils. In the example shown, each coil (e.g., coil 1226$x_1$) comprises a pair of coils arranged in a horseshoe configuration.

Conventionally, the radial position of the rotor 1224 is sensed by a series of gap sensors 1202. Output from the sensors 1202 feed into suitable gap sensor electronics 1204 to produce a usable signal for a controller 1206. The controller 1206 drives power amplifiers 1208 (two are illustrated) to supply sufficient current to the coils 1226$x_1$, 1226$x_2$, 1226$y_1$, 1226$y_2$ to energize the coils in a manner that positions the rotor to a desired position in the x-y plane.

Typically, the controller 1206 and/or the gap sensor electronics 1204 process signals in the digital domain. In other words, the position signals output from the gap sensors 1202 (usually analog) are processed as digital signals by the controller 1206 to determine the amount of correction in the x-direction and in the y-direction that is needed to place the rotor in a desired position. The x- and y-direction correction data are then converted back to analog signals so that the power amplifiers 1208 can produce suitable drive currents to energize the coils 1226$x_1$, 1226$x_2$, 1226$y_1$, 1226$y_2$ appropriately.

In the magnetic bearing arrangement shown in FIG. 11, the magnetic bearings 1106a, 1106b are elements separate from the motor 1102. However, the magnetic bearings can be incorporated in the construction of the motor in an arrangement referred to as a "bearingless drive".

FIG. 13 shows an example of a bearingless drive. The bearingless drive shown in the figure comprises two bearingless motor units 1302a, 1302b. Each bearingless motor unit 1302a, 1302b comprises, respectively, a stator element 1322a, 1322b and a rotor element 1324a, 1324b. Although not explicitly shown in the figure, each stator element 1322a, 1322b comprises two set of windings; there is one set of windings (phase coils), called the motor windings, for torque production and there is a separate set of windings, called the suspension windings, for rotor suspension. The motor windings are energized by a source of drive currents to produce rotational torque. The suspension windings are energized by a separate source of drive currents to produce radial forces for positioning in the x-y direction (i.e., the radial direction).

The motor windings in each stator element 1322a, 1322b are connected in parallel. A generator produces drive currents to energize both sets of motor windings for rotary operation. Each of the suspension windings in each stator element 1322a, 1322b, on the other hand, is energized by its own generator in order to provide independent suspension control by each suspension winding.

BRIEF SUMMARY OF THE INVENTION

A magnetic bearing system for a rotary device according to the present invention includes receiving a drive signal and adjusting the drive signal in accordance with deviations of the rotor of the rotary device from a neutral (desired) rotor position. Deviation in the rotor is detected by a position sensor. An output of the position sensor is used to adjust the drive signal to produce an adjusted drive signal. The adjusted drive signal is applied to phase coils of the stator of the rotary device. When energized by the adjusted drive signal, the phase coils generate both the rotational torque to produce rotary motion to operate the rotary device and the radial forces to affect the radial position of the rotor during operation of the rotary device thereby magnetically suspending the rotor an in particular to return the rotor to its neutral (desired) radial position. Typical rotary devices that the present invention can be used with include brushless AC motors and brushless DC motors.

In an alternative embodiment of the present invention, a magnetic bearing for a rotary device includes receiving a multiphase drive signal and adjusting the multiphase drive signal in accordance with deviations of the rotor of the rotary device from a neutral rotor position. More specifically, a position sensor produces an output signal that indicates the position of the rotor of the rotary device relative to a neutral rotor position. The output signal is used to adjust the multiphase drive signal to produce a modified signal which is then applied to a set of phase coils comprising the magnetic bearing. More specifically, the neutral or zero point of the multiphase drive signal is shifted. The resulting modified signal can then be applied to phase coils comprising the magnetic bearing. The phase coils comprising the magnetic bearing are energized by the positioning signal and generate radial forces to suspend the rotor during operation of the rotary device. This particular embodiment of the present invention is suitable for motors, generators, and the like. In the case of motors, the phase coils comprising the magnetic bearing are provided to operate in conjunction with the torque generating component of the rotary device.

BRIEF DESCRIPTION OF THE DRAWINGS

FIGS. 2B and 2C illustrate an example of an inductive radial position sensor.

FIG. 9 illustrates an example of a magnetic bearing of the present invention in a bearingless motor configuration.

FIG. 10 illustrates an example of a magnetic bearing unit of the present invention configured with a rotary device having a motor component and a separate magnetic bearing component.

DETAILED DESCRIPTION OF THE INVENTION

Following is a description of various aspects and embodiments of the present invention presented in conjunction with the figures identified above. First, a description of some principles underlying the present invention will be given. The discussion will then proceed with a description of specific embodiments of the present invention.

The present invention is directed to the operation of magnetic bearings and bearingless drives for use in rotary devices. An important aspect of the present invention is the departure from the use of a conventional position sensing system based on Cartesian (X-Y) coordinates to the use of a polar (ρ, φ) coordinate system. Where the conventional position sensing system produces an X-position signal and a Y-position signal that represents the displacement of the rotor of the rotary device in an X-Y coordinate system, a polar coordinate position sensing system in accordance with the present invention produces a time-varying signal whose magnitude is proportional to the absolute value of displacement of the rotor from a neutral (desired) position and a phase shift that represents the direction of the displacement, where the phase shift is relative to the time varying signal when the rotor is at its neutral position. Thus, $$u = U \sin(\omega t + \phi),$$

where U represents magnitude (ρ) and φ represents phase shift ("phase").

Using a system of polar coordinates permits the use of the time-varying output signal u of the position sensor and is a most straightforward and natural way to represent the radial position of the rotor. The presentation of information in the form of a single harmonic signal whose parameters are directly correlated with the parameters of displacement, namely magnitude and phase, greatly simplifies the processing circuitry used to determine position, resulting in simple and efficient bearingless systems.

Figure 14:
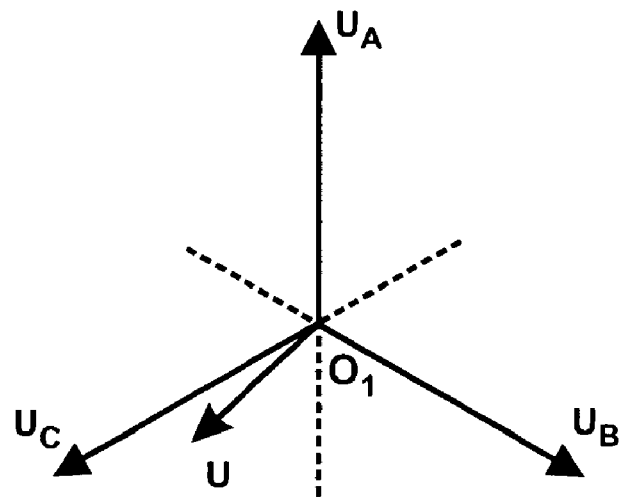
FIGS. 14, 15A, 16A, and 16B illustrate some principles of the present invention.

Refer now to FIGS. 14-16B, keeping in mind that an aspect of the present invention is to combine position sensors, bearings, and torque production elements in a single construction. Consider the relationship between polyphase signals $U_A$, $U_B$, $U_C$ for driving the rotor of a polyphase motor and a position signal u of the position sensor indicating the radial position of the rotor relative to a neutral position of the rotor. FIG. 14 illustrates a vector representation of the polyphase drive signals $U_A$, $U_B$, $U_C$, having a neutral point at $O_1$, for driving the polyphase motor. The position signal, represented in the figure as a vector u, is the output signal of a position sensor which represents a displacement of the rotor of the motor from a neutral radial position of the rotor. More specifically, the position signal u is a time-varying signal whose amplitude represents the distance of the displacement from the neutral position and whose phase represents the direction of the displacement. An example of such a position sensor is disclosed in commonly-owned, co-pending U.S. application Ser. No. 12/044,835, which is incorporated herein in its entirety for all purposes.

Figure 11:
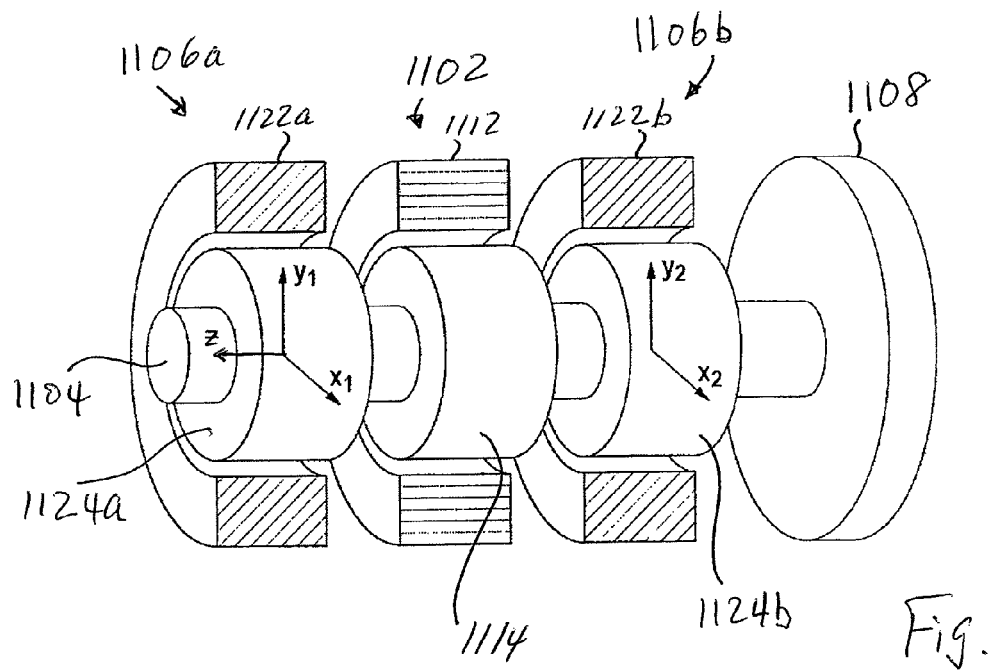
FIG. 11 illustrates a conventional magnetic bearing arrangement for suspending a rotor.
Figure 13:
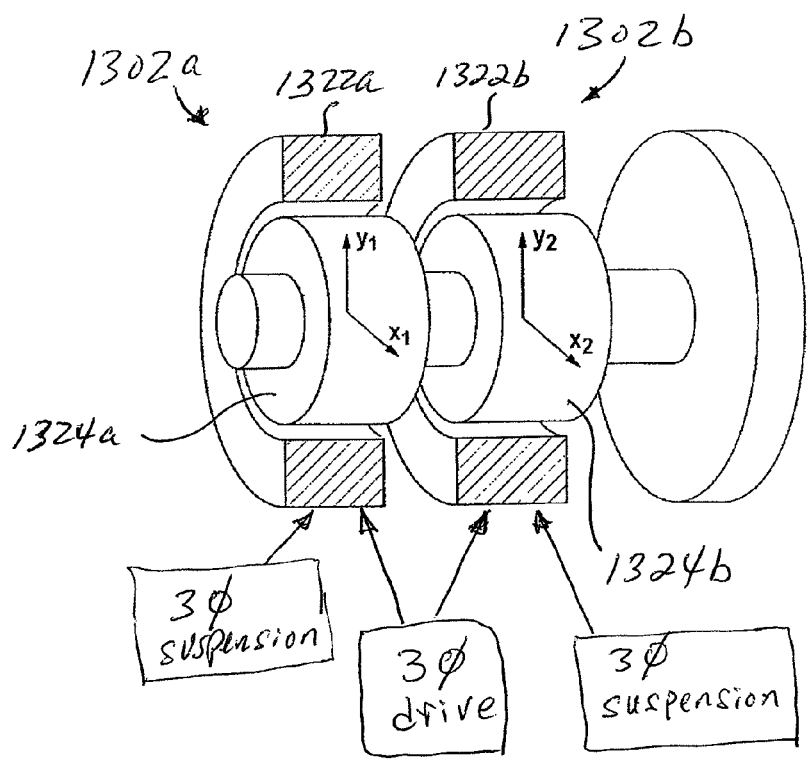
FIG. 13 shows an example of a conventional bearingless drive.
Figure 12:
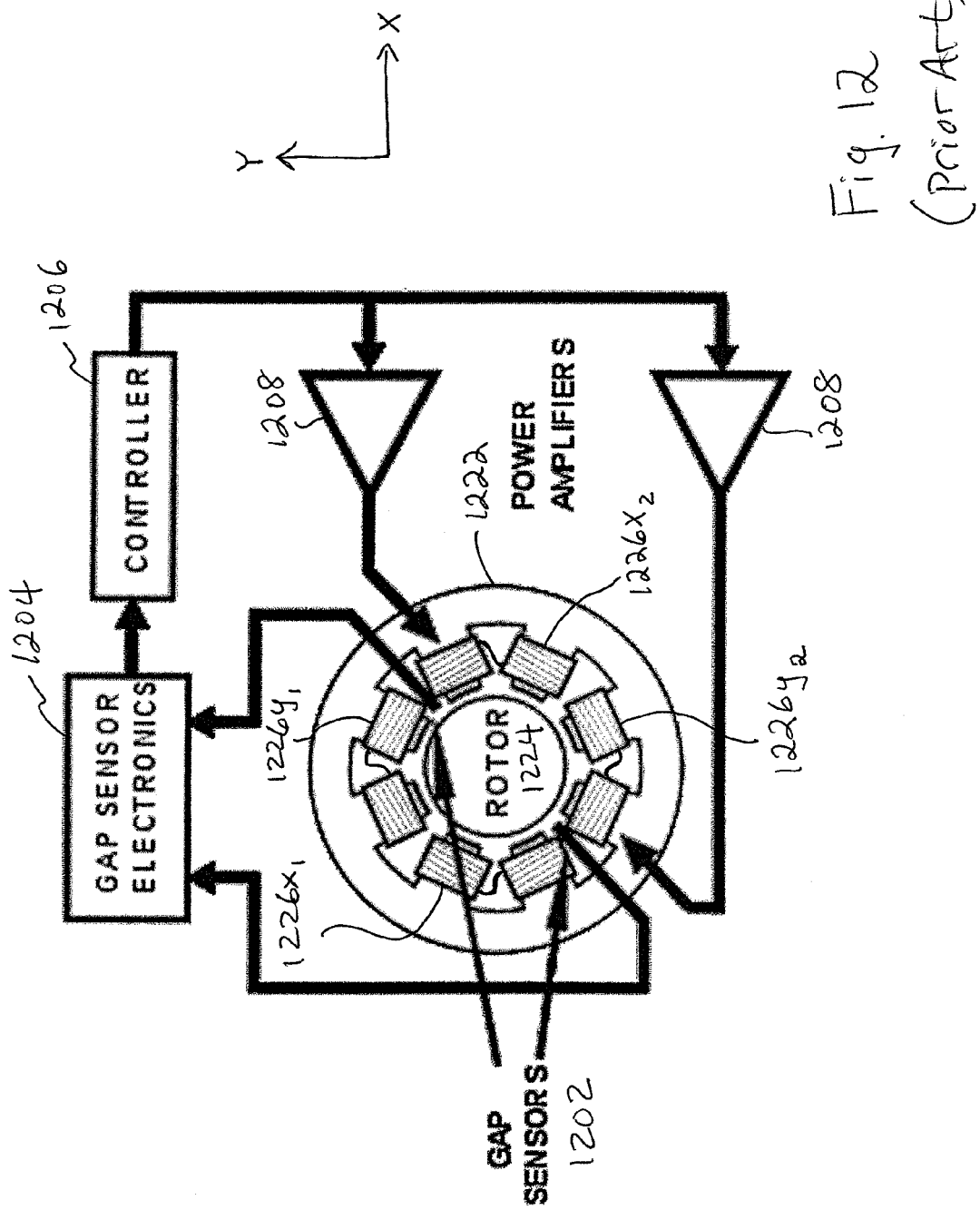
FIG. 12 shows additional detail of the convention magnetic bearing shown in FIG. 11, along with conventional circuitry.
Figure 15A:
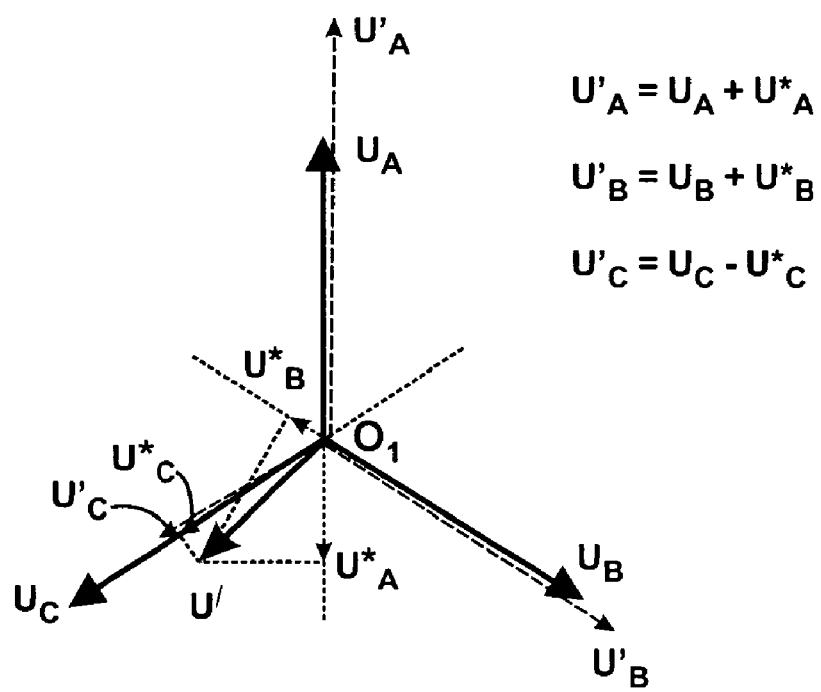

FIG. 15A is a vector-based explanation of how the position signal (represented as vector u in FIG. 14) of the position sensor can be used to produce a drive signal in accordance with a novel aspect of the present invention, namely producing a drive signal to drive the phase coils of a polyphase motor so as produce (1) rotational torque forces and (2) rotor suspension forces. FIG. 15A shows that the position signal u can be decomposed into components that project onto the vector representation of the polyphase drive signals $U_A$, $U_B$, $U_C$. Thus, the position signal u comprises vector components $U^*_A$, $U^*_B$, $U^*_C$ respectively projected onto vectors $U_A$, $U_B$, $U_C$. The vector components $U^*_A$, $U^*_B$, $U^*_C$ can then be combined with the respective drive signals $U_A$, $U_B$, $U_C$ to modify them. The modified drive signals, represented in the figure as vectors $U'_A$, $U'_B$, $U'_C$, are then applied to drive the phase coils of the polyphase motor. When driven by the modified drive signals, the phase coils will produce a torque force in order to cause rotation of the rotor and a suspension force in order to cause repositioning of the rotor to its neutral radial position. A particularly salient aspect of the present invention is to be noted here, namely that, in accordance with the present invention, only one set of phase coils are driven by the modified signal. Whereas prior art configurations provide one set of phase coils for torque production and a separate set of phase coils for rotor suspension (see FIGS. 11 and 13), the present invention uses only one set of phase coils for both torque production and rotor suspension.

Figure 15B:
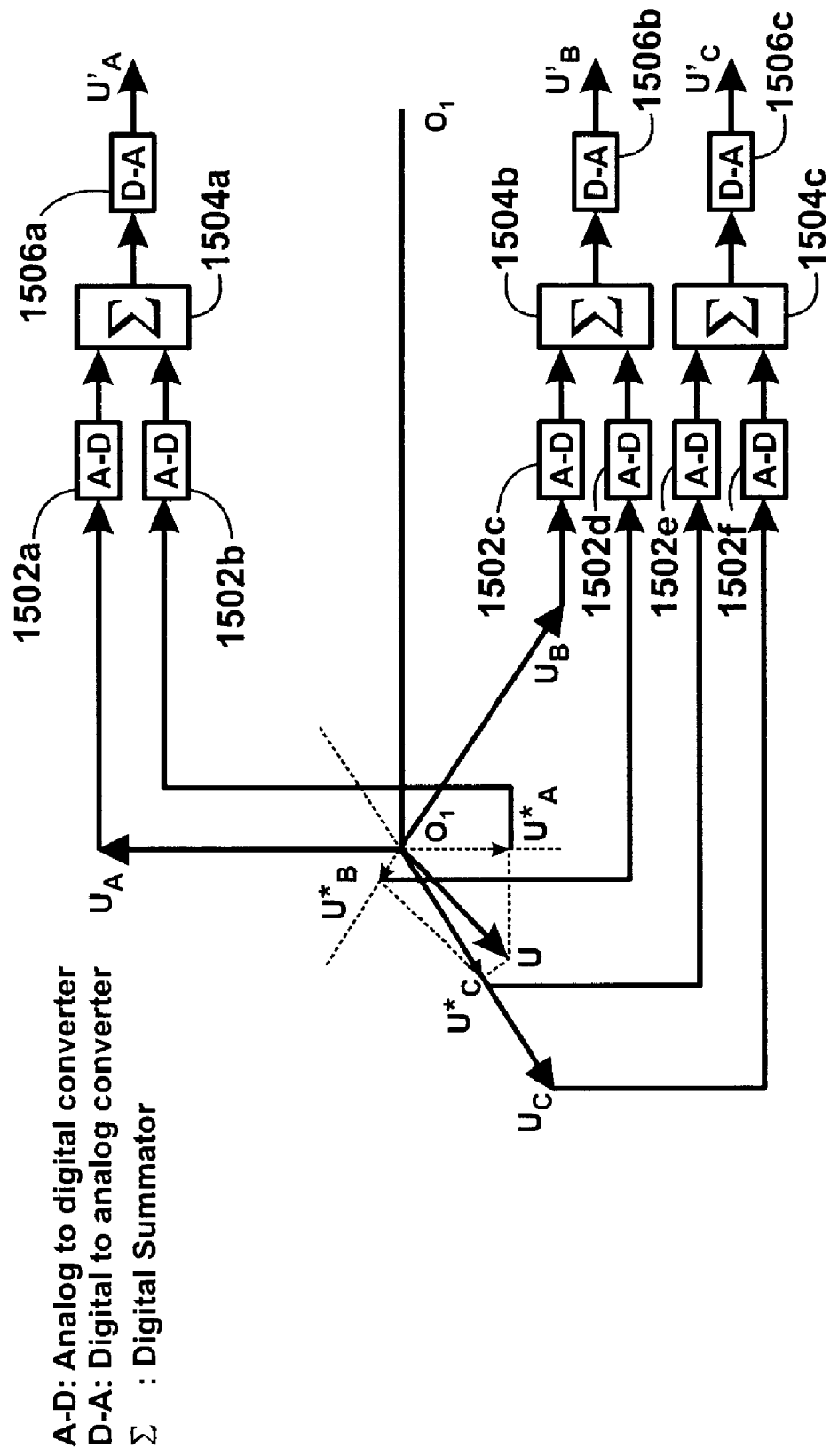
FIG. 15B illustrates a digital circuit embodiment of the present invention.

FIG. 15B shows a circuit implementation of the process shown in FIG. 15A. The circuit implementation comprises analog-to-digital (A/D) converters 1502a-1502f, each of which converts one of the signal components to produce a suitable digital signal for subsequent processing. For example, the polyphase drive signals $U_A$, $U_B$, $U_C$ are A/D converted respectively by A/D converters 1502a, 1502c, 1502f to produce digital signals which respectively feed into summation circuits 1504a-1504c. Likewise, the component signals $U^*_A$, $U^*_B$, $U^*_C$ of the position signal u are A/D converted respectively by A/D converters 1502b, 1502d, 1502e. The resulting digital signals are fed into the summation circuits 1504a-1504c. Digital-to-analog conversion circuitry 1506a-1506c convert the digital output of the summation circuits 1504a-1504c to produce the resulting modified drive signals $U'_A$, $U'_B$, U'c which are then fed to the phase coils of the motor. Thus, for example, the drive signal $U_A$ is converted to its digital form and summed via circuit 1504a with the digital version of component signal $U^*_A$ to produce a modified digital signal. The output of digital output summation circuit 1504a is converted to an analog signal $U'_A$ via converter 1506a. Alternate implementations using microprocessor circuits are well within the knowledge of those of ordinary skill in the relevant microprocessor and digital processing arts and thus need not be discussed herein.

The modified polyphase signals $U'_A$, $U'_B$, $U'_c$ are applied to respective phase coils of the motor. For example, the modified polyphase signals $U'_A$, $U'_B$, $U'_c$ constitute a three-phase signal for driving a three-phase motor, and in particular the three phase coils comprising the three-phase motor. More specifically, the signal $U'_A$ drives one of the three phase coils, the signal $U'_B$ drives a second one of the three phase coils, and the signal $U'_C$ drives the third one of the three phase coils. When the phase coils of the motor are driven by the drive signals $U'_A$, $U'_B$, $U'_C$, the resulting magnetic fields produced by the phase coils are able to produce both a torque force to provide rotation of the rotor and suspension force to suspend the rotor in a manner so as to maintain the radial position of the rotor at its neutral position. This aspect of the present invention is discussed in more detail below.

Figure 16A:
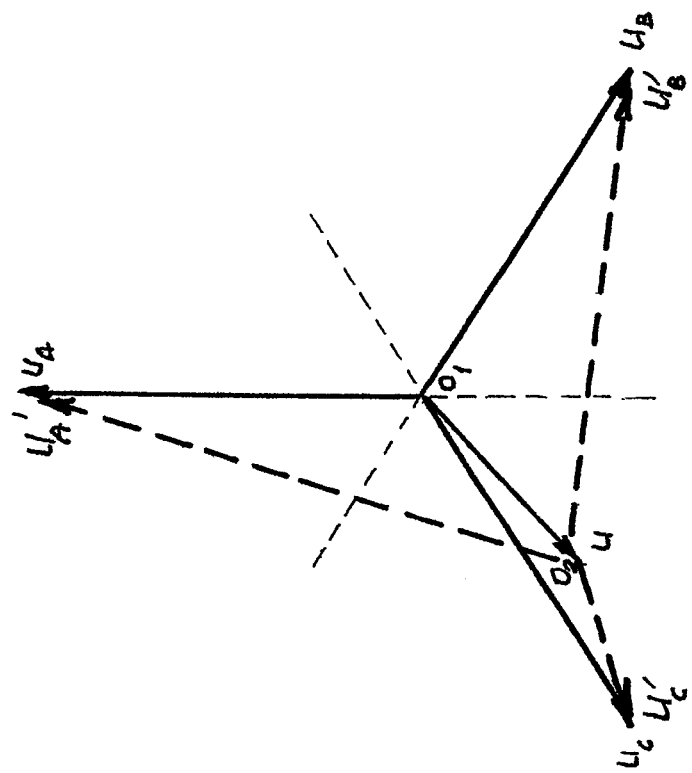
Figure 16B:
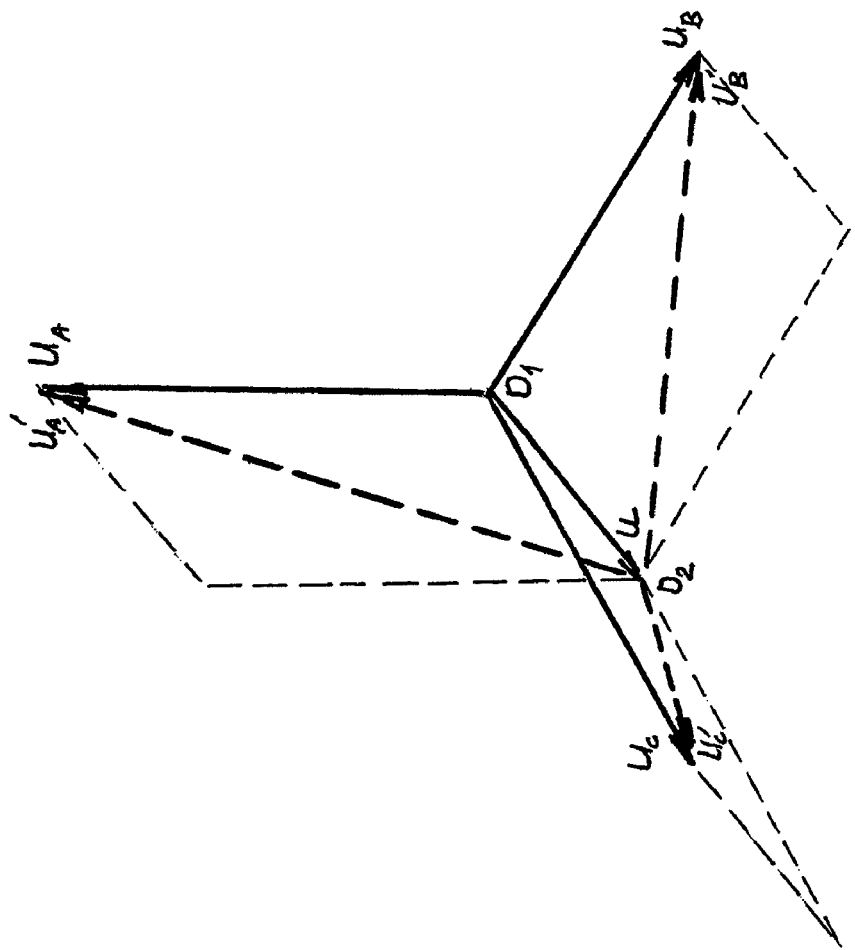

FIG. 16A illustrates an alternative approach, in accordance with the present invention, for producing the modified drive signals $U'_A$, $U'_B$, $U'_c$. In the approach illustrated in FIG. 16A, the output signal of the position sensor (represented in FIG. 14 as vector u) is used to shift the neutral point $O_1$ of the polyphase drive signals $U_A$, $U_B$, $U_c$ from $O_1$ to $O_2$. By so doing, the drive signals $U_A$, $U_B$, $U_c$ are altered to produce drive signals $U'_A$, $U'_B$, $U'_c$. The resulting drive signals $U'_A$, $U'_B$, $U'_C$ also provide both torque generation and rotor suspension when applied to energize the phase coils of the motor as explained above. In this configuration of the present invention, the only operation that is required is suitable amplification of the output signal of the position sensor, an operation that can be achieved by any of a number of known amplification techniques. FIG. 16B shows the decomposition of the vectors representing the modified drive signals $U'_A$, $U'_B$, $U'_c$, illustrating that the neutral point $O_1$ can be effectively shifted using digital circuitry similar to that shown in FIG. 15B.

Returning to FIG. 16A, a one step solution in accordance with the present invention that is an improvement over the embodiment of the present invention illustrated in FIGS. 15A, 15B, and 16B will now be described. The apparatus of FIG. 15B requires considerable circuitry/processing, namely signal conversion between analog and digital formats and digital processing, in order to produce the desired drive signals $U'_A$, $U'_B$, $U'_c$. Following is a description of an embodiment of the present invention which does not require the A/D and D/A circuitry 1504a-1504f, or the summation circuitry 1506a-1506c.

Figure 1:
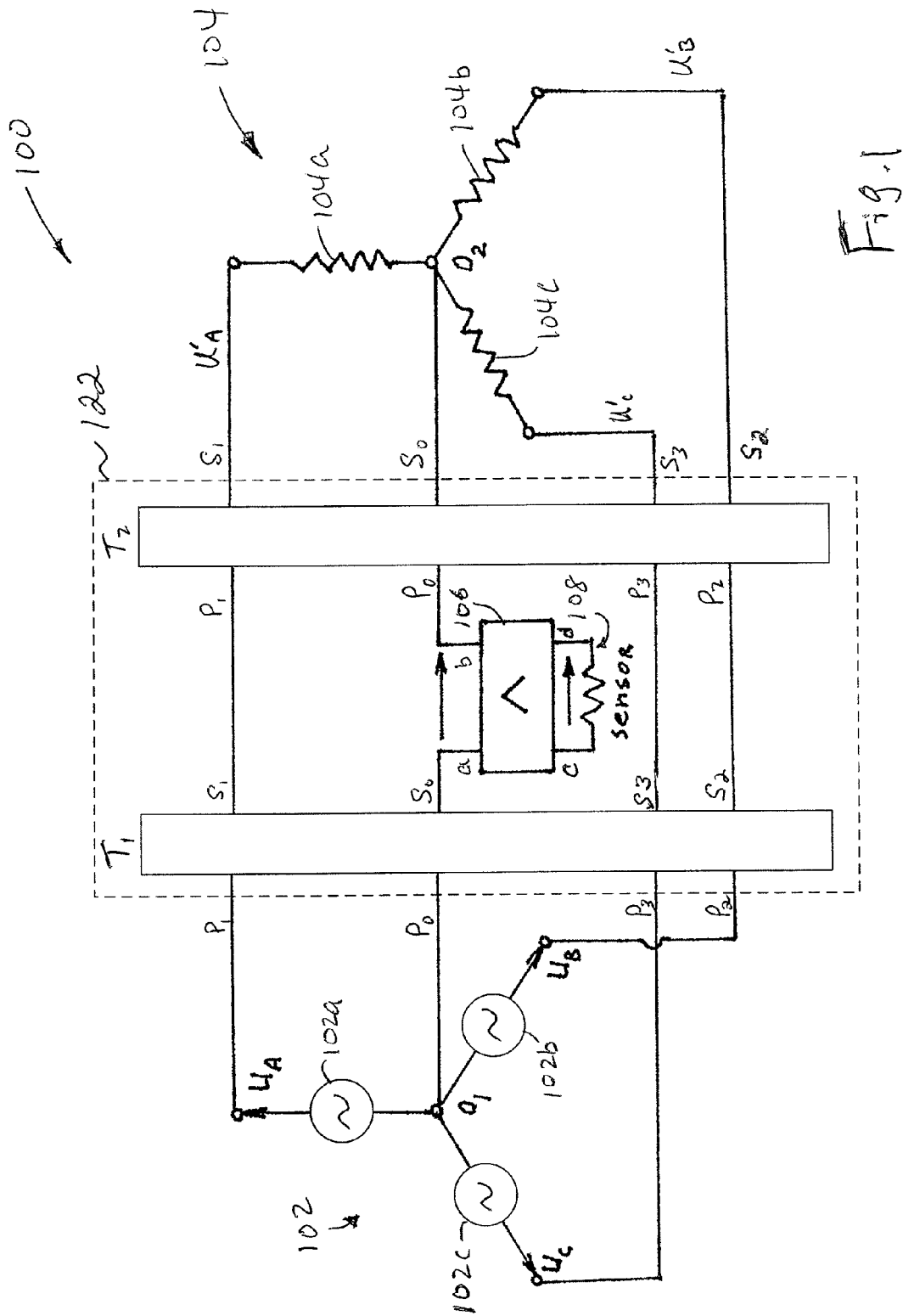
FIG. 1 is a high-level schematic diagram of the circuitry of a magnetic bearing in accordance with the present invention.

Referring to FIG. 1, a schematic diagram of a magnetic bearing drive system 100 that embodies the principles discussed above in FIG. 16A is presented. The magnetic bearing drive system incorporates a magnetic bearing in accordance with the present invention is shown for a specific illustrative embodiment, namely a three-phase AC brushless motor. It will be appreciated from the discussion that follows that the magnetic bearing of the present invention can be readily adapted for use with other similar rotary devices. The arrangement shown in the figure is referred to as a bearingless drive. The discussion will now turn to a description of specific illustrative embodiments of the present invention, incorporating the principles set forth above.

In FIG. 1, a signal generator component 102 generates an N-phase sinusoidal drive signal. In the specific embodiment shown in the figure, the signal generator 102 is a three-phase generator which comprises three signal generating elements 102a, 102b, 102c. Each signal generating element produces a sine wave signal that is 120° out of phase relative to the sine wave signals output from the other two signal generating elements. The figure represents these signals as $U_A$, $U_B$, U. The configuration of the signal generating elements 102a, 102b, 102c is referred to as a Wye-configured ("Y-configured"), or a "star-configured" connection, having a neutral (or central or zero) point $O_1$. The neutral point $O_1$ is at some voltage potential which serves as a reference voltage potential for each signal generating element 102a, 102b, 102c; e.g., the neutral point $O_1$ can be ground potential.

The signal generator 102 is connected to one side of a circuit referred to herein as the neutral point shifting circuit 122. The neutral point shifting circuit comprises transformers $T_1$ and $T_2$, an amplifier 106, and a position sensor 108. Operation of the neutral point shifting circuit 122 will be explained below. A three-phase brushless motor 104 is connected to the other side of the neutral point shifting circuit 122. The motor 104 comprises three phase coils 104a, 104b, 104c.

The signal generator 102 is connected to a transformer $T_1$ of the neutral point shifting circuit 122. The terminals of the transformer $T_1$ are identified with respect to the primary and secondary windings which comprise the transformer. On the primary side are terminals $p_1$, $p_2$, $p_3$, $p_0$. On the secondary side are terminals $s_1$, $s_2$, $s_3$, $s_0$. Notable is the connection of the neutral point $O_1$ to the terminal $p_0$ of the transformer $T_1$. The significance of this connection will be discussed below.

The transformer $T_1$ is connected to an amplifier element 106 and to another transformer $T_2$. Additional detail of the amplifier element 106 will be presented below. As for the transformer $T_2$, it comprises primary windings and secondary windings, along with corresponding terminals. Thus, the primary side of transformer $T_2$ has terminals $p_1$, $p_2$, $p_3$, $p_0$, while the secondary side of transformer $T_2$ has terminals $s_1$, $s_2$, $s_3$, $s_0$.

The secondary side of the transformer $T_2$ of the neutral point shifting circuit 122 outputs modified signals $U'_A$, $U'_B$, $U'_C$ which are coupled to the corresponding phase coils (also referred to as phase windings) 104a, 104b, 104c which comprise the stator element of the three-phase motor 104. The generalized illustration of the motor 104 shown in FIG. 1 represents only the phase coils 104a, 104b, 104c of the motor 104. The phase coils 104a, 104b, 104c are arranged in a Y-configuration, having a neutral (or central, or zero) point denoted by $O_2$. Notable is the connection of the neutral point $O_2$ to the terminal $s_0$ of the transformer $T_2$. The significance of this connection will be discussed below. The construction of multiphase motors, such as motor 104, are very well known and do not require additional discussion.

The amplifier 106 includes terminals a, b, c, d. The terminal a of the amplifier 106 is connected to the terminal $s_0$ on the secondary coil of transformer $T_1$. The terminal b of the amplifier 106 is connected to the terminal $p_0$ on the primary coil of transformer $T_2$. The terminals c and d of the amplifier 106 are connected to the output of a radial position sensor 108. The position sensor 108 provides a signal that indicates the displacement of the radial position of the rotor of the motor 104 from a neutral radial position of the rotor.

Figure 2A:
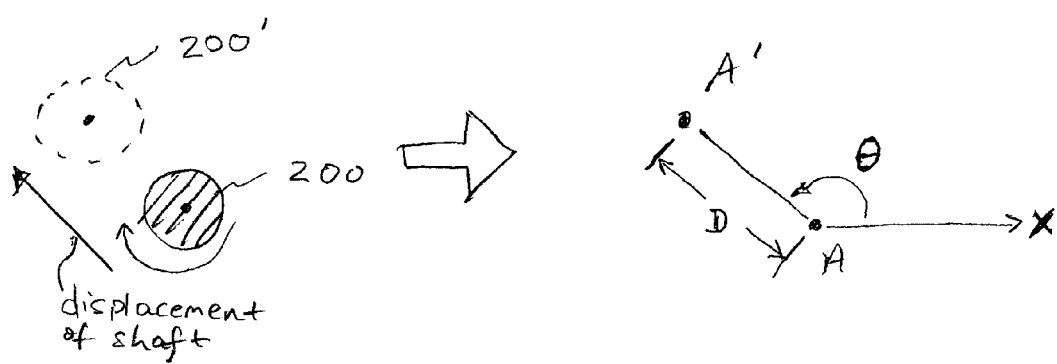
FIG. 2A explains the principles of operation of a radial position sensor used in the present invention.

Reference is now made to FIGS. 2A-2C for a brief explanation of the operation of the radial position sensor 108, additional detail being provided in U.S. application Ser. No. 12/044,835. FIG. 2A illustrates the principles of operation of the radial position sensor 108. A head-on view of a rotor shaft 200 of a motor is shown; the shaft is shown rotating in a clockwise direction. Typically, it is desirable that the shaft 200 does not deviate from its neutral position during operation of the motor (the neutral position can be referred to as an "initial position" or a "desired position"). However, in practice the shaft 200 is likely to deviate from its neutral position, referred to as a radial displacement, during operation of the motor. FIG. 2A illustrates, in an exaggerated manner, radial displacement of the shaft 200 to a displaced position at 200'.

FIG. 2A includes a simplified diagram showing the neutral position A of the axis of rotation of shaft 200 and the new position A' of the axis of rotation of the shaft when it is radially displaced. The displacement of the axis of rotation from A to A' can be represented by polar coordinates, as shown in the figure. The distance of the displacement from position A to position A' is represented by D. The angle Θ represents the angle subtended between an axis X the line A-A'.

FIG. 2B shows an example of a radial position sensor 108, and in particular an inductive radial position sensor suitable for generating an output signal representative of the radial displacement of the rotor of a motor (in terms of polar coordinates) vis-à-vis displacement of the rotor shaft 200. FIG. 2C is a circuit schematic representation of FIG. 2B. Additional detail of this sensor is provided in U.S. application Ser. No. 12/044,835. Briefly, the position sensor 108 comprises a set of plates 202, 204, 206, and a polyphase signal generator. As can be seen in FIG. 2C, the output signal $U_{OUT}$ 222 of the position sensor 108 is shown connected to terminals c and d of the amplifier 106 (FIG. 1).

Emitters 202a, 202b, 202c are fixedly disposed about a rotating plate 204 to which the shaft 200 (FIG. 2A) is fixed. These emitters 202a, 202b, 202c are electromagnets, each emitting a magnetic field when energized. A rotating plate 204 is connected to the shaft 200 and rotates in proximity to the emitters 202a, 202b, 202c. FIG. 2C shows a three-phase signal source connected to the emitters 202a, 202b, 202c where each phase $U_A$, $U_B$, $U_C$ of the signal source is connected to one of the emitters. The magnetic fields emanating from the emitters 202a, 202b, 202c couple to the rotating plate 204 and to the shaft 200. An output signal $U_{OUT}$ can be obtained by wrapping a coil of wire about the shaft 200 (assuming that the shaft is of a suitable magnetic material) and measuring the current flow induced in the coil.

The amount of coupling of each phase $U_A$, $U_B$, $U_C$ to the rotating plate 204 and shaft 200 will depend on the distances $d_1$, $d_2$, $d_3$ between the emitters and the rotating plate. The distances $d_1$, $d_2$, $d_3$ will vary as the shaft 200 moves about from its neutral position during operation of the motor, and consequently so will the amount of coupling of the phase $U_A$, $U_B$, $U_C$ to the rotating plate 204 and shaft 200. The closer an emitter (e.g., 202a) is to the rotating plate 204, the greater the coupling, and vice versa. Thus, the output signal $U_{OUT}$ appearing will vary depending on the radial position of the rotating plate 204 relative to the emitters 202a, 202b, 202c. Suppose the input signals (phases $U_A$, $U_B$, $U_C$) are represented by the following:

$$U_A = U \sin \omega t$$

$$U_B = U \sin(\omega t + 120°)$$

$$U_A = U \sin(\omega t + 240°),$$

where U is the magnitude of the sinusoidal signal. The output signal $U_{OUT}$ of the position sensor 108 is generally represented by:

$$U_{OUT} = U_m (\sin \omega t + \phi),$$

where $U_m$ is the magnitude of the signal $U_{OUT}$ and $\phi$ is a phase shift of the signal $U_{OUT}$. The position sensor 106 defines a "neutral position" for the rotor so that when the radial position of the rotor is at this neutral position the output signal $U_{OUT}$ is substantially zero; i.e., $U_m$ substantially zero (i.e., signal magnitude is substantially zero), and of course $\phi$ is zero since there is no phase shift when there is no signal.

Suppose now that the rotor is displaced from its neutral position to a displace position. The output signal $U_{ouT}$ of the position sensor 108 will be:

$$U_{OUT} = U_{mx} (\sin \omega t + \phi),$$

where $U_{mx}$ is the magnitude of the output signal $U_{OUT}$, and $\phi$ is the phase of the output signal relative to the output signal when the rotor was in its neutral position. The output signal $U_{OUT}$ at this displaced position of the rotor represents the radial displacement of the rotor in polar coordinate terms, where $U_{mx}$ is proportional to the displacement distance D (FIG. 2A) and the phase shift $\phi$ is equal to the subtended angle Θ (FIG. 2A).

Figure 2D:
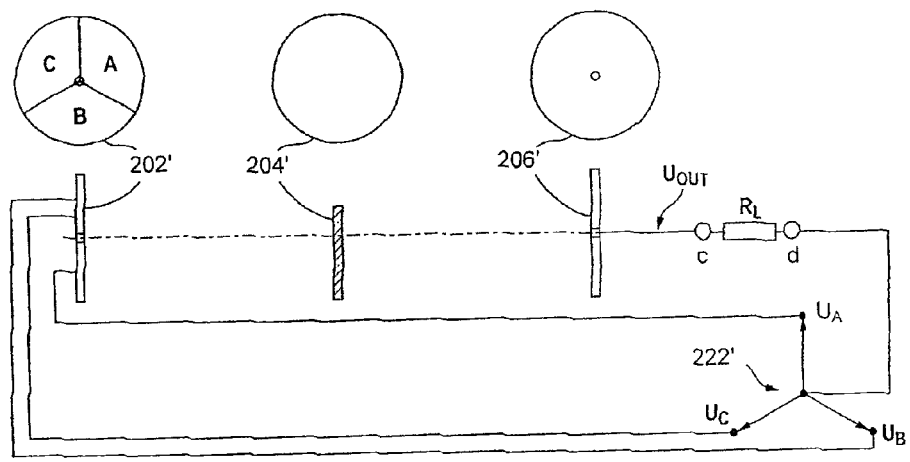
FIG. 2D shows an example of a capacitive radial position sensor.

FIG. 2D shows another example of a radial position sensor 108, and in particular a capacitive radial position sensor suitable for generating an output signal representative of the radial displacement of the rotor of a motor (in terms of polar coordinates) vis-à-vis displacement of the rotor shaft 200 (FIG. 2A). Additional detail of this sensor is provided in U.S. application Ser. No. 12/044,835. The position sensor 108 comprises a set of plates 202', 204', 206', and a polyphase signal generator. The output signal $U_{OUT}$ of the position sensor 108 is shown connected to terminals c and d of the amplifier 106 (FIG. 1).

Stationary plates 202' and 206' are fixedly disposed about the shaft 200 (FIG. 2A). These plates 202', 206' are stationary relative to the shaft. A rotating plate 204' is connected to the shaft 200. The stationary plate 202' comprises three electrically isolated conductive wedges A, B, C. The stationary plate 206' is an electrically conductive plate. The rotating plate 204' is of a suitable dielectric material. The plates 202', 204', 206' are arranged in proximity to each to allow for capacitive coupling between the stationary plates 202', 206'. A three-phase signal source 222' is connected to the stationary plate 202 such that each phase $U_A$, $U_B$, $U_C$ of the signal source is connected to one of the wedges A, B, C of the stationary plate. The stationary plate 206' is capacitively coupled to the stationary plate 202' and has a resulting output signal $U_{OUT}$ that represents a superposition of the phases $U_A$, $U_B$, $U_C$ capacitively coupled from plate 202' via plate 204'.

Figure 3:
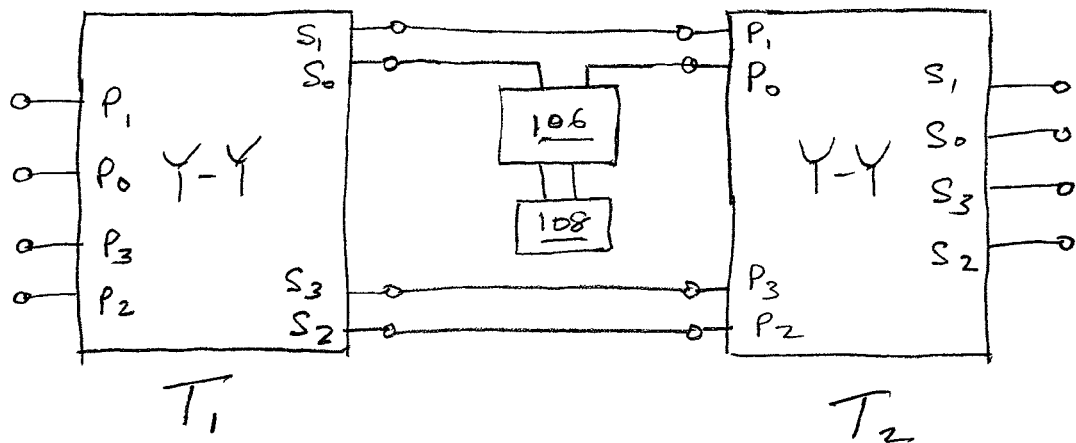
FIG. 3 is a more detailed diagram of an example of a neutral point shifting circuit in accordance with the present invention.

The discussion will now turn to FIG. 3 and an explanation of the neutral point shifting circuit 122 shown in FIG. 1. FIG. 3 illustrates additional details of the neutral point shifting circuit 122. In the particular embodiment shown in the figure, the transformer $T_1$ is a three-phase transformer. More specifically, the transformer $T_1$ is a three-phase transformer comprising a Y-configured primary winding and a Y-configured secondary winding, a so-called "Y-Y transformer." The primary-side terminals $p_1$, $p_2$, $p_3$ of transformer $T_1$ are connected to the phases of the signal generator 102, while the primary-side terminal $p_0$ of transformer $T_1$ is connected to the neutral $O_1$ (e.g., ground potential) of the signal generator 102. The secondary-side terminals $s_1$, $s_2$, $s_3$, $s_0$ of transformer $T_1$ correspond respectively to terminals $p_1$, $p_2$, $p_3$, $p_0$ of the transformer.

The transformer $T_2$ in the embodiment shown in FIG. 3 is also a Y-Y transformer. The secondary-side terminals $s_1$, $s_2$, $s_3$ of transformer $T_2$ are connected to the phase coils 104a, 104b, 104c of the motor 104, while the secondary-side terminal $s_0$ of the transformer is connected to the neutral $O_2$ of the phase coils. The primary-side terminals $p_1$, $p_2$, $p_3$, $p_0$ of transformer $T_2$ correspond respectively to terminals $s_1$, $s_2$, $s_3$, $s_0$ of the transformer.

Figure 4:
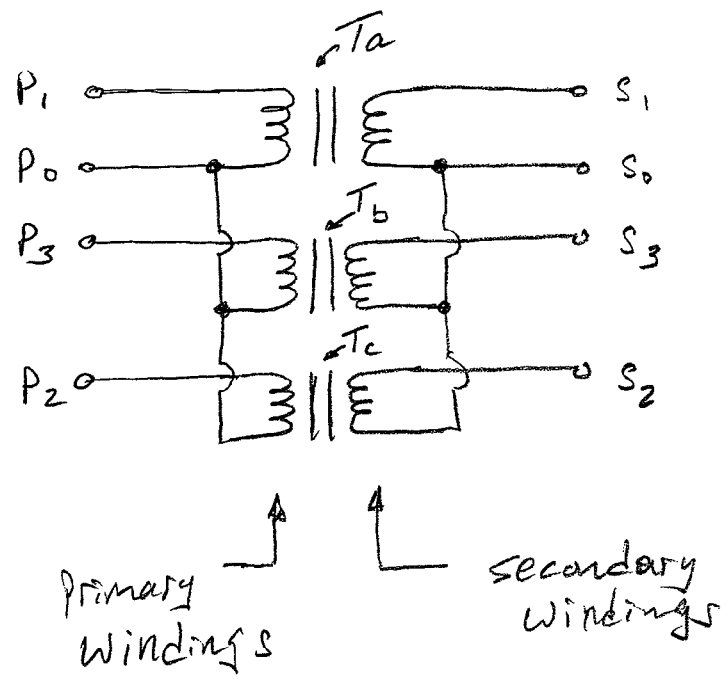
FIG. 4 is a schematic representation of a three-phase Y-Y transformer.

FIG. 4 shows a wiring diagram for a three-phase Y-Y transformer. The transformer comprises three transformer elements $T_a$, $T_b$, $T_c$. The primary windings of the transformer elements $T_a$, $T_b$, $T_c$ are connected in a Y-configuration, and likewise the secondary windings of the transformer elements $T_a$, $T_b$, $T_c$ are connected in a Y-configuration. The terminals $p_1$, $p_2$, $p_3$, $p_0$, $s_1$, $s_2$, $s_3$, $s_0$ of the transformer elements $T_a$, $T_b$, $T_c$ are connected so as to correspond with the terminal arrangement shown in FIGS. 1 and 3.

Figure 5:
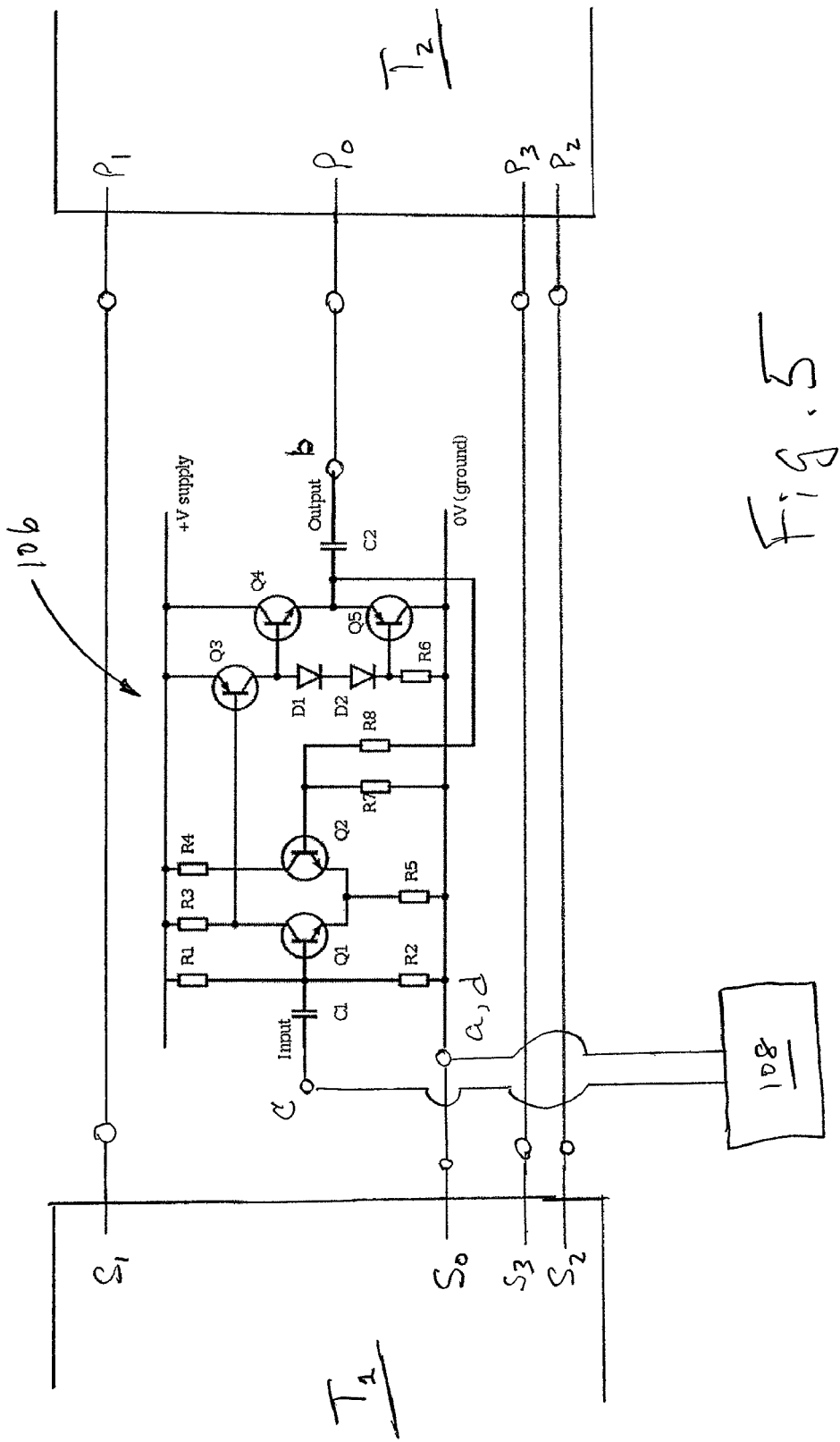
FIG. 5 shows additional detail of the amplifier 106 shown in FIG. 1.

FIG. 5 shows an example of the amplifier 106 in accordance with the present invention. Bipolar transistors Q1 to Q5 are shown, but the design can be realized using FETs (field effect transistors) as well. Specific values for the resistor and capacitor elements can be readily determined by one of ordinary skill. The "Input" signal is obtained from the output of the position sensor 108. More particularly, the output of the position sensor 108 is coupled to the terminals c and d of amplifier 106 (see FIG. 1), which respectively are tied to the amplifier input and ground. A portion of the transformer $T_1$ is shown in this figure. The terminal $s_0$ of transformer $T_1$ is connected to terminal a of amplifier 106, which is also tied to ground. Likewise, a portion of the transformer $T_2$ is shown; the terminal $p_0$ of the transformer is connected to terminal b of amplifier 106, which is tied to the amplifier "Output".

Figure 6:
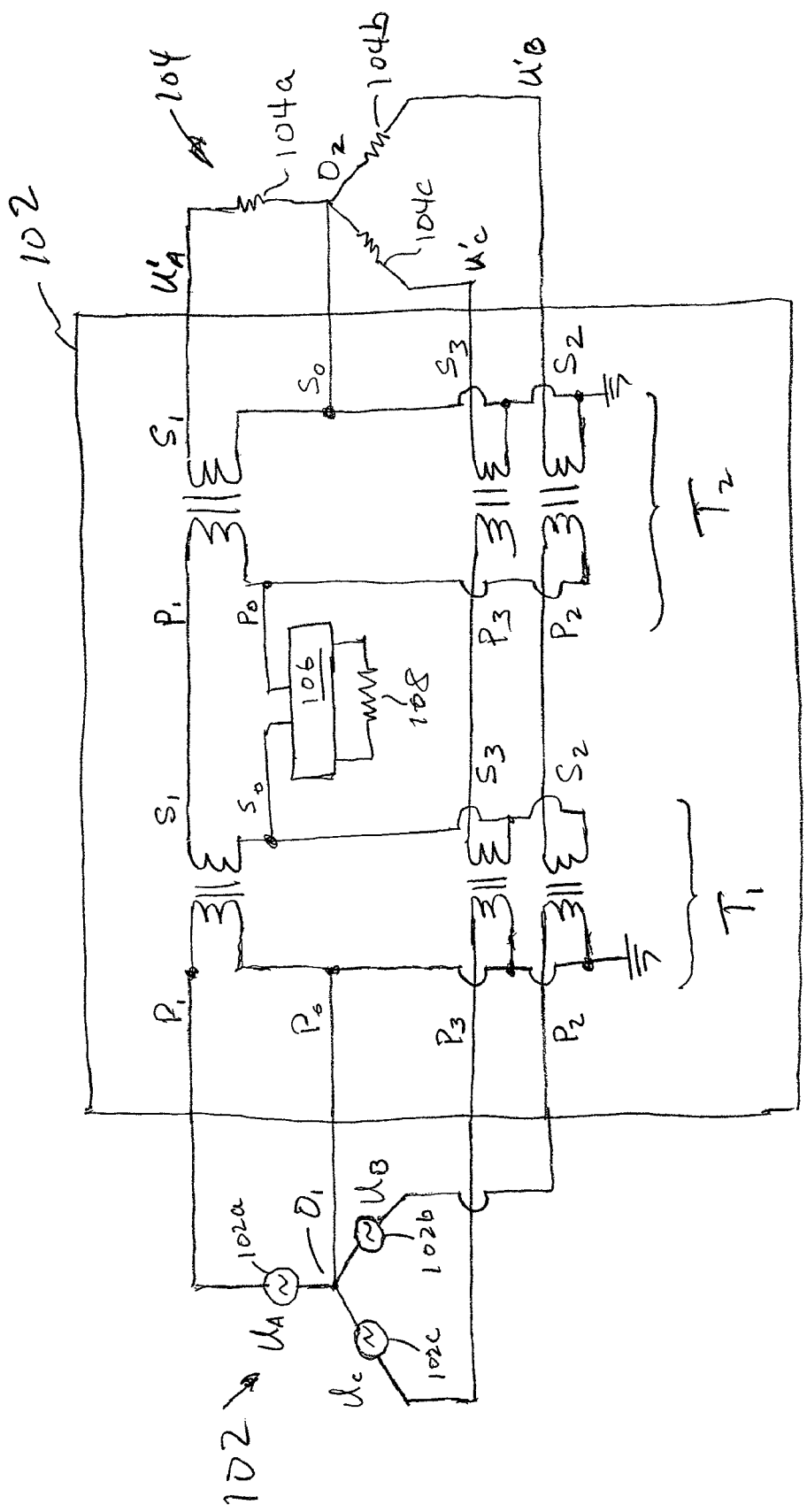
FIG. 6 is a more detailed schematic diagram of the circuitry for a magnetic bearing shown in FIG. 1.

FIG. 6 is a circuit schematic diagram illustrating the connection of the circuitry shown in FIGS. 1 and 3-5. The amplifier illustrated in FIG. 5 is a conventional power amplifier, and it will be appreciated that other conventionally known amplifier designs can be used. For example, magnetic amplifiers are a well established technology that are well suited for use with the present invention.

Figure 7A:
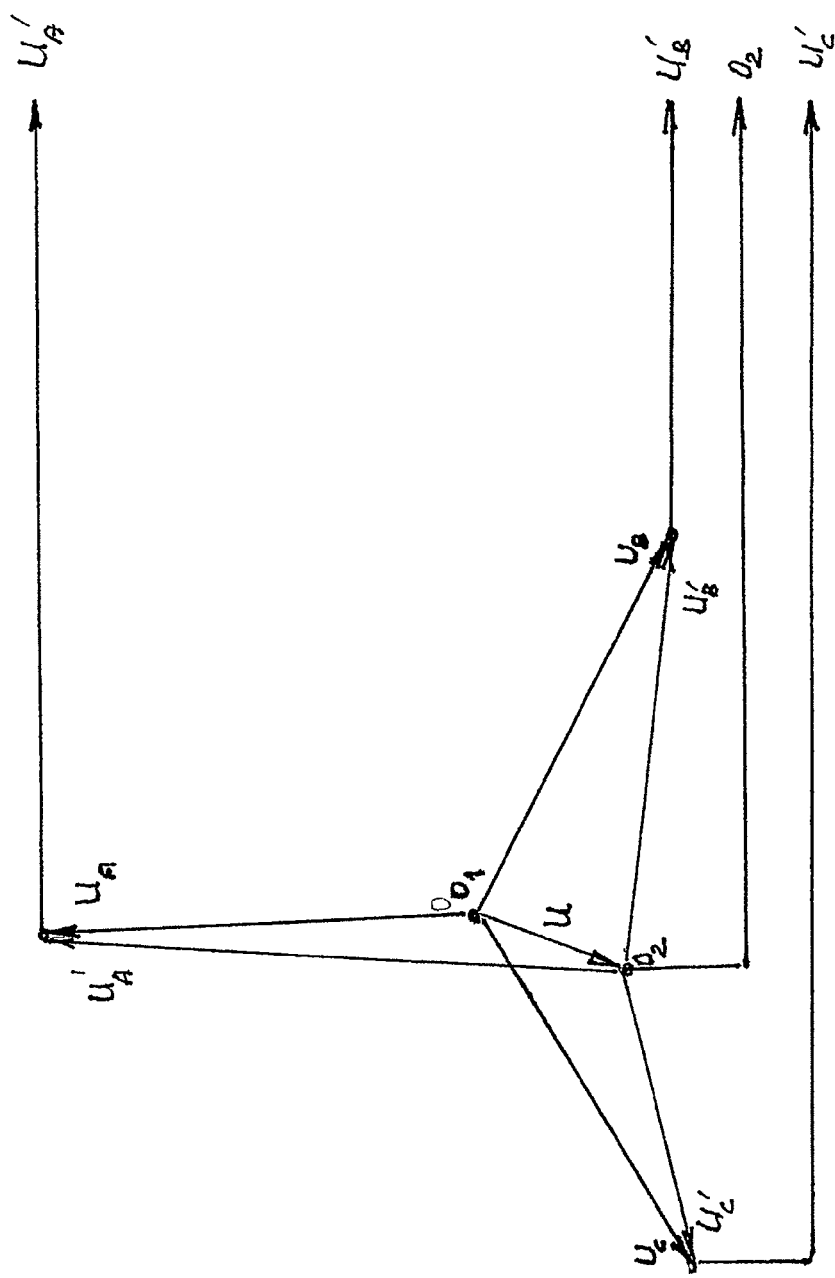
FIGS. 7A and 7B illustrate the principles of operation of the present invention.

Referring now to FIG. 7A, operation of the present invention will be explained. The signal generator 102 produces input drive signals $U_A$, $U_B$, $U_C$ relative to a neutral point $O_1$. As discussed above, the neutral point $O_1$ is typically ground potential. The input drive signals $U_A$, $U_B$, $U_C$ are represented in vector notation in the figure. When the rotor of the motor 104 moves from its neutral position, the radial position sensor 108 senses the displacement and outputs a signal that represents the displacement, where the output signal provides information indicative of the position of the displaced rotor relative to the neutral position. The output signal of the position sensor 108 is represented in FIG. 7A by the designation U.

In accordance with the present invention, the output signal U is used to shift the neutral point $O_1$ of the input signals $U_A$, $U_B$, $U_C$ to produce modified drive signals $U'_A$, $U'_B$, $U'_C$ having a shifted neutral point $O_2$. In other words, the reference potential of the modified drive signals $U'_A$, $U'_B$, $U'_C$ is different from the reference potential of the input signals $U_A$, $U_B$, $U_C$. The modified drive signals $U'_A$, $U'_B$, $U'_C$ are applied to the phase coils 104a, 104b, 104c comprising the stator of the motor 104.

The modified drive signals $U'_A$, $U'_B$, $U'_C$ are modified in that their neutral point $O_2$ is shifted with respect to the neutral point $O_1$ of the input drive signals $U_A$, $U_B$, $U_C$. The modified drive signals $U'_A$, $U'_B$, $U'_C$ can be viewed as having offset components that are superimposed on the sinusoidal components of the input drive signals $U_A$, $U_B$, $U_C$. The offsets in the modified drive signals $U'_A$, $U'_B$, $U'_C$ energize the phase coils 104a, 104b, 104c to produce radially directed magnetic forces, in addition to producing rotational torque forces. Thus, the phase coils 104a, 104b, 104c, when energized by signals $U'_A$, $U'_B$, $U'_C$, will generate torque forces and radial forces. By comparison, conventionally produced drive signals simply result in torque production only.

The amount of offset superimposed on each of the modified signals $U'_A$, $U'_B$, $U'_C$ will vary depending on where the neutral point $O_1$ is shifted. The radial force generated by each phase coil 104a, 104b, 104c will therefore differ in strength. Consequently, the rotor will be biased in a direction depending on the relative strengths of the radial forces produced by the phase coils 104a, 104b, 104c and exerted on the rotor.

Figure 7B:
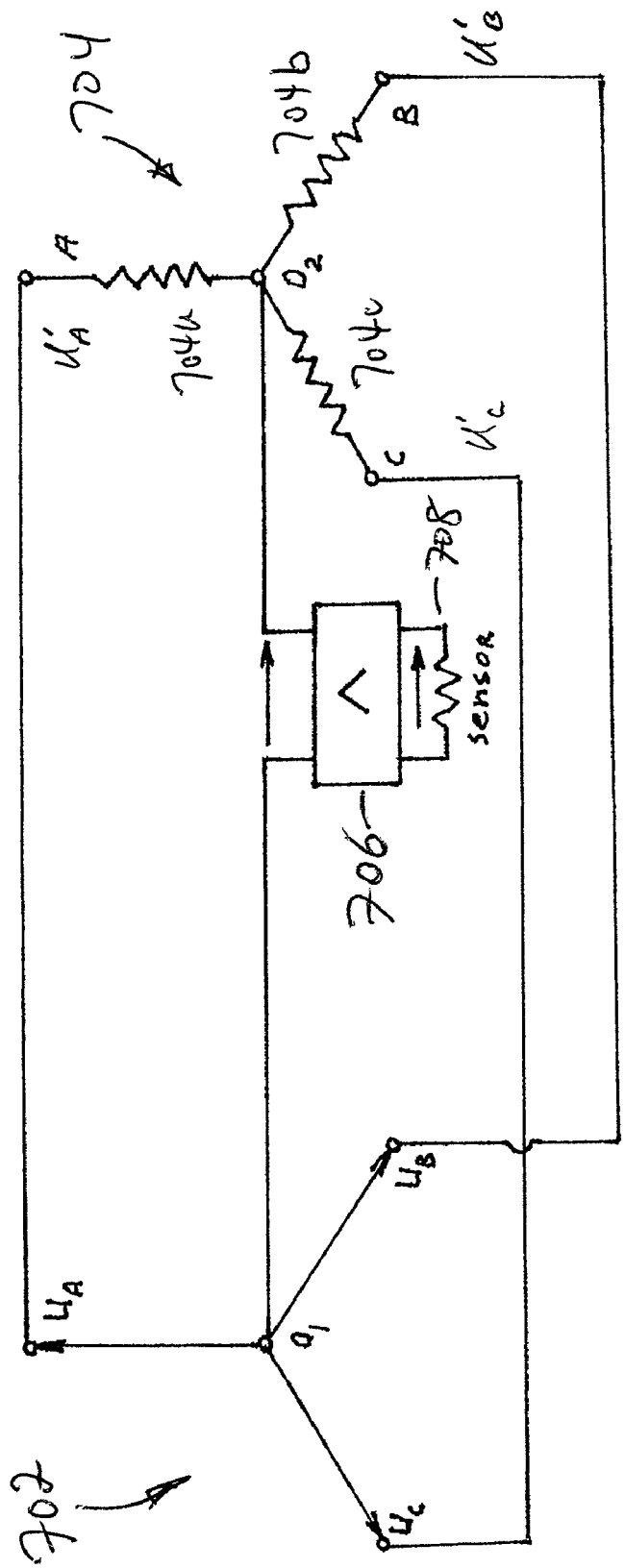

FIG. 7B shows a generalized circuit that embodies the principles set forth in FIG. 7A. Signal generator 702 produces an N-phase drive signal; the figure shows an example for a three-phase signal generator. The phase signals $U_A$, $U_B$, $U_C$ are applied to the phase coils 704a, 704b, 704c of the stator of motor 704. Conventionally, the phase signals $U_A$, $U_B$, $U_c$ generate only a rotational torque because the neutral point of the generator and the neutral point of the phase coils are at the same potential, typically ground potential.

However, as the figure shows, the neutral point $O_1$ of the phase signals $U_A$, $U_B$, $U_C$ is shifted based on the output signal U of the position sensor 708. The resulting modified signals $U'_A$, $U'_B$, $U'_C$ have a shifted neutral point $O_2$. Due to the shifted neutral point $O_2$ of the modified signals $U'_A$, $U'_B$, $U'_C$, the phase coils generate radially directed magnetic forces in addition to torques, thus affecting the radial position of the rotor in order to suspend the rotor. The modified signals $U'_A$, $U'_B$, $U'_C$ therefore obviate the need for a separate system of bearings to suspend the rotor. Referring to FIG. 1, the inclusion of the transformers $T_1$ and $T_2$ serve to isolate the neutral points $O_1$ and $O_2$ in order to avoid short circuiting the signal generator 102 and the phase coils 104a, 104b, 104c.

Figure 8A:
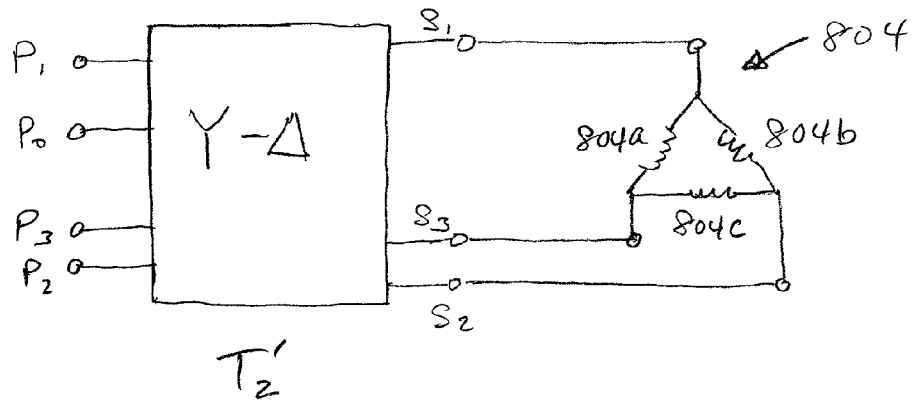
FIGS. 8A-8C show variations of the present invention for Y-connected and Δ-connected components.

The foregoing embodiment of the present invention is adapted for a motor 104 (FIG. 1) having Y-connected phase coils 104a, 104b, 104c. The present invention can be readily adapted for a motor having Δ-connected phase coils. FIG. 8A shows the schematic diagram for the phase coil connections 804a, 804b, 804c of a Δ-connected motor 804.

Figure 8B:
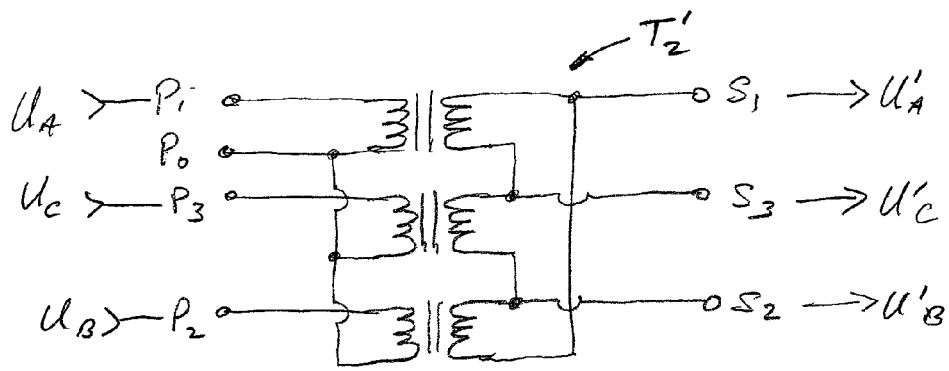

FIG. 8A illustrates an embodiment of the present invention suitable for a Δ-connected motor 804, where the phase coils 804a, 804b, 804c are connected in a Δ-configuration. Referring to FIG. 1 or FIG. 6, the Y-connected motor 104 is replaced with the Δ-connected motor 804 of FIG. 8A. To accommodated a Δ-connected motor, the Y-Y transformer $T_2$ in the neutral point shifting circuit 122 is replaced by the Y-Δ transformer $T'_2$. FIG. 8B shows an example of the wiring for a Y-Δ transformer.

In the embodiment shown in FIGS. 8A and 8B, the neutral point $O_1$ of the input drive signals $U_A$, $U_B$, $U_C$ is shifted by the amplifier 106, in the manner discussed above, and coupled to the motor 804 by way of the Y-Δ transformer $T'_2$. The resulting modified drive signals $U'_A$, $U'_B$, $U'_C$ include the sinusoidal torque-generating signals which energize the phase coils 804a, 804b, 804c to generate rotational torque. The modified drive signals $U'_A$, $U'_B$, $U'_C$ also include offset components which energize the phase coils 804a, 804b, 804c to also generate radially directed magnetic forces to adjust the radial position of the rotor element of the motor 804.

Figure 8C:
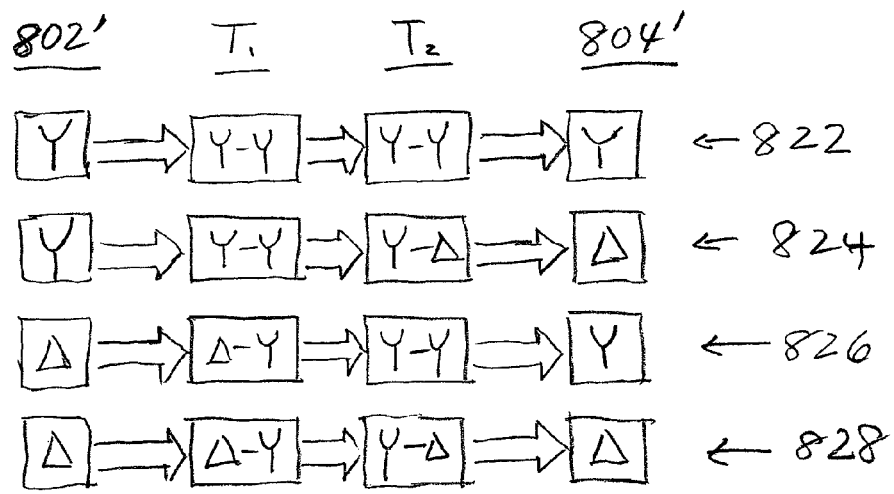

FIG. 8C shows the transformer configuration for other combinations of Y-connected and Δ-connected signal generator types 802' and motor types 804'. Four configuration combinations 822, 824, 826, 828 are shown using schematic representations that indicate the connection type, namely Y- or Δ-connected. Combination 822 represents the configuration shown in FIG. 1, where both the signal generator 802' and the motor 804' are Y-connected devices. The transformers $T_1$, $T_2$ serve to isolate the potential difference that exist between the neutral points $O_1$, $O_2$. Combination 824 represents the configuration explained in FIGS. 8A and 8B, where the signal generator 802' is a Y-connected device and the motor 804' is a Δ-connected device. Combination 826 represents a configuration where the signal generator 802' is a Δ-connected device and the motor 804' is a Y-connected device. Here, the transformer $T_1$ is connected in a Δ configuration on its primary side and in a Y configuration on its secondary side. The transformer $T_2$ is connected in a Y configuration on its primary side and on its secondary side. Combination 828 shows a configuration where both the signal generator 802' and the motor 804' are Δ-connected devices. Here, the transformer $T_1$ is connected in a Δ configuration on its primary side and in a Y configuration on its secondary side, while the transformer T2 is connected in a Y configuration on its primary side and in a Δ configuration on its secondary side.

FIG. 9 is an illustration of a particular motor configuration according to the embodiment of the present invention depicted in FIG. 1. The example shown in FIG. 9 depicts a motor 900 having two motor units 904a, 904b operating together as a single motor. Each motor unit 904a, 904b is represented in FIG. 1 by the motor 104. The output of the neutral point shifting circuit 122 is connected to the motor unit 904a in the manner shown in FIG. 1. The motor unit 904a, 904b are connected such that respective windings of each motor unit are connected in series.

The foregoing embodiments of the present invention are adapted for a magnetic bearing system in which the motor's phase coils are energized by a drive signal that generates rotational torque and to generate radial force; i.e., a bearingless motor. The result is that only a single set of phase coil windings are required to operate the motor (i.e., torque production) and to provide control over the radial position of the rotor (production of suspension forces), thus suspending an operating rotor without the need for physical bearings or lubrication. The dual functionality that the phase coils made possible by the present invention represents a significant advantage over conventional magnetic bearing systems which require a separate set of windings to provide the functionality of a magnetic bearing. However, it will be appreciated that the present invention can be readily adapted for use where only the suspension functionality is needed.

In the previously described embodiments, the element 104 is a motor and the phase coils 104a, 104b, 104c are components of the motor. The phase coils thus operate to produce rotational torque in conjunction with a rotor element comprising an arrangement of permanent magnets. However, the present invention can be used in a suspension-only mode where the element 104 shown in FIG. 1 operates simply as a magnetic bearing and the phase coils 104a, 104b, 104c do not contribute to or are otherwise involved in producing rotational torque, but rather provide radial force to adjust the radial position of the rotor of a motor to control suspension of the rotor. This is readily achieved where the phase coils 104a, 104b, 104c are arranged to magnetically interact with some portion of the motor (e.g., a portion of the rotor shaft) other than the rotor component of the motor. Thus, in the suspension-only embodiment, the modified drive signals $U'_A$, $U'_B$, $U'_C$ might be more aptly referred to as suspension signals, repositioning signals, or the like.

FIG. 10 shows an example of a suspension-only embodiment of the present invention. Here, a motor 1000 comprises a motor unit 1002 (comprising a motor stator and a motor rotor) and a suspension unit 1004, corresponding to element 104 in FIG. 1. The suspension unit 1004 comprises a stator component 1012 which in turn comprises windings configured in the same manner as coils 104a, 104b, 104c shown in FIG. 1. The rotary component 1014 is a single element of magnetic material, rather than a plurality of individual permanent magnets as in the case of a rotor of a motor. The suspension unit 1004 is driven by a polyphase source (not shown) comprising signals $U_A$, $U_B$, $U_C$.

The suspension-only embodiment shown in FIG. 10 still represents a significant improvement over conventional magnetic bearing systems. Whereas conventional magnetic bearing systems require significant amounts of digital processing to produce suitable polar coordinate correction signals, the present invention as embodied in FIG. 10 produces a position sensing signal (via a position sensor such as position sensor 108 in FIG. 1) which is then used to shift the neutral point $O_1$ of the polyphase source signals $U_A$, $U_B$, $U_C$. The resulting neutral point shifted signals $U'_A$, $U'_B$, $U'_C$ are then applied to the phase coils 104a, 104b, 104c of suspension unit 1004.

What is claimed is:

1. A method for controlling a magnetic bearing for a motor comprising:
   generating a first multiphase signal;
   producing a time-varying position signal indicative of a radial position of a rotor of the motor;
   altering a neutral point of the first multiphase signal based on the time-varying position signal to produce a second multiphase signal wherein the second multiphase signal has a neutral point that is at a different electrical potential than the neutral point of the first multiphase signal; and
   energizing phase coils comprising the rotor with the second multiphase signal,
   wherein the phase coils produce a rotational force on the rotor and a radial force on the rotor when the phase coils are energized by the second multiphase signal.

2. The method of claim 1 wherein the time-varying position signal is representative of the radial position of the rotor relative to a neutral position of the rotor.

3. The method of claim 1 wherein the electrical potential of the neutral point of the first multiphase signal varies in concert with the time-varying position signal.

4. The method of claim 1 wherein the time-varying position signal varies as the radial position of the rotor varies, wherein the step of altering a neutral point of the first multiphase signal includes varying the electrical potential of the neutral point of the first multiphase signal in concert with variations in the time-varying position signal.

5. The method of claim 1 wherein the time varying position signal has an amplitude and a phase that are proportional respectively to a distance and direction of the radial position of the rotor relative to the neutral position.

6. The method of claim 1 wherein the first multiphase signal is a three-phase signal comprising three signal components.

7. A method for controlling a magnetic bearing for a motor, the motor comprising a rotor suspended by the magnetic bearing, the method comprising:
- receiving an N-phase drive signal, each phase of the drive signal corresponding to one of N phase coils comprising the magnetic bearing;
- receiving a displacement signal indicative of a radial position of the rotor relative to a neutral radial position of the rotor;
- combining the N-phase drive signal with the displacement signal to produce an adjusted N-phase drive signal; and
- producing a radial force and a torque force on the rotor by applying the adjusted N-phase drive signal to the phase coils of the magnetic bearing whereby the phase coils affect the radial position of the rotor relative to the neutral position of the rotor and cause rotation of the rotor,
- wherein the step of combining the N-phase drive signal with the displacement signal includes altering a neutral point of the N-phase drive signal based on the displacement signal.

8. The method of claim 7 wherein when the rotor is in the neutral position, the displacement signal is substantially zero.

9. The method of claim 7 wherein a neutral point of the N-phase drive signal has an electrical potential that is different than an electrical potential of a neutral point of the adjusted N-phase drive signal.

10. The method of claim 7 wherein the displacement signal is a time varying signal having an amplitude and a phase that are proportional respectively to a distance and direction of the radial position of the rotor relative to a neutral position.

11. The method of claim 7 wherein the combining is performed without the use of a digital circuitry.

12. The method of claim 7 wherein the combining is performed with the use of analog circuitry.

13. A magnetic bearing system for suspending a rotor of a motor comprising:
- a multiphase signal generator having a plurality of signal terminals, the multiphase signal generator further having a neutral point terminal;
- a position sensor operative with the rotor of the motor to produce a time-varying position signal indicative of a radial position of the rotor; and
- a shifting circuit connected to the plurality of signal terminals and the neutral point terminal of the multiphase signal generator, the shifting circuit having an input terminal connected to the receive the time-varying position signal from the position sensor, the shifting circuit further having a plurality of output signal terminals corresponding to the signal terminals of the multiphase signal generator and an output neutral point terminal,
- wherein the shifting circuit produces signals at the output signal terminals thereof which are based on signals that appear on the signal terminals of the multiphase signal generator,
- wherein the output neutral point terminal of the shifting circuit is at an electrical potential that varies depending on the time-varying position signal of the position sensor.

14. The system of claim 13 wherein the neutral point terminal of the multiphase signal generator is at ground potential.

15. The system of claim 13 wherein the output signal terminals of the shifting circuit are connected to phase coils of a stator of the motor, wherein the output neutral point terminal of the shifting circuit is connected to a neutral terminal of the phase coils.

16. The system of claim 15 whereby when the phase coils are energized by the signals produced at the output signal terminals of the shifting circuit, the phase coils produce a rotational force on the rotor to cause rotation thereof and a radial force on the rotor to cause displacement thereof in the radial direction.

17. A magnetic bearing system to suspend a rotor of a motor comprising:
- a first transformer having a primary winding and a secondary winding, the primary winding configured for connection to a generator that generates a first signal, the secondary winding being configured in a Y-configuration and having a neutral point connection;
- a second transformer having a primary winding and a secondary winding, the primary winding being configured in a Y-configuration and having a neutral point connection, the secondary winding configured for connection to coils of the magnetic unit; and
- an amplifier circuit having a first input to receive a displacement signal indicative of a displacement of the rotor relative to a neutral position of the rotor, a second input connected to the neutral point connection of the secondary winding of the first transformer, and an output connected to the neutral point connection of the primary winding of the second transformer,
- wherein a second signal output from the secondary winding of the second transformer creates magnetic fields in the coils of the magnetic unit to change the position of the rotor in response to deviations of the position of the rotor from the neutral position.

18. The system of claim 17 wherein the suspension coils produce radial forces to change the position of the rotor in response to deviations of the position of the rotor from the neutral position.

* * * * *